United States Patent Office 2,945,836
Patented July 19, 1960

2,945,836

PROCESS OF POLYMERIZING MONOMERIC STYRENE IN THE PRESENCE OF A COPOLYMER OF ETHYLENE AND VINYLENE CARBONATE

Ival O. Salyer and James A. Herbig, Dayton, Ohio, assignors to Monsanto Chemical Company, St. Louis, Mo., a corporation of Delaware No Drawing. Filed Dec. 11, 1953, Ser. No. 397,793

2 Claims. (Cl. 260—45.5)

This invention relates to improved polystyrene type resins. In some of its aspects, the invention pertains to methods of improving the impact strength of polystyrene.

Polystyrene is one of the most important plastics of commerce. Its many valuable properties are well known. However, polystyrene as ordinarily formulated is characterized by low impact strength, so that it cannot be used for many potential applications where particular toughness is required. While the use of plasticizers of numerous types is known, this means of improving the impact strength and other physical properties of polystyrene lowers the heat distortion or softening point to such a degree as to make the product unsuitable for most applications. It is known to incorporate natural rubber and various synthetic rubber materials into polystyrene to improve the impact strength. However, the unsaturation of such materials tends to lower the age resistance of the resulting polystyrene blend. In incorporating any resinous material in polystyrene, problems of compatibility arise. If the added material is too incompatible with the polystyrene, not only the appearance but the physical properties of the resulting blend make it unfit for practical use.

In accordance with the present invention in preferred embodiments, polystyrene-type resins are made by polymerizing styrene monomer, preferably with the aid of a polymerization catalyst, while having intimately dispersed therein an ethylene-vinylene carbonate copolymer. While ethylene-vinylene carbonate copolymers can be mechanically blended with preformed polystyrene, the advantages of the present invention are not obtainable to an important degree. By polymerizing styrene containing a relatively small amount of ethylene-vinylene carbonate copolymer, a resulting high molecular weight material is obtained resembling polystyrene per se in most of its properties but having greatly improved toughness, particularly as measured by the impact strength. Copolymers of ethylene with vinylene carbonate are new materials, and are described in detail in copending application of Earl W. Gluesenkamp and John D. Calfee, Serial No. 355,859, filed May 18, 1953, now U.S. Patent No. 2,847,398, the contents of which application are incorporated herein by reference.

The materials admixed with styrene monomer in the practice of the present invention are copolymers of ethylene with vinylene carbonate. Properties of vinylene carbonate and methods of preparing same are described by Newman and Addor, Jour. Amer. Chem. Soc., 75, 1263, March 5, 1953. Vinylene carbonate has the structural formula:

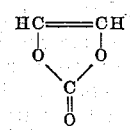

A suitable method of preparing vinylene carbonate is chlorination of ethylene carbonate to form monochloroethylene carbonate, followed by dehydrochlorination of the latter by reaction with an amine, resulting in vinylene carbonate.

The invention encompasses use of ethylene/vinylene carbonate copolymers containing ethylene and vinylene carbonate in all proportions. Most copolymers will contain from 5 weight percent to 99 weight percent ethylene and from 95 weight percent to 1 weight percent vinylene carbonate, based upon the combined weights of the monomers entering into the copolymer. In its broadest aspects the invention contemplates use of polymers of ethylene containing the smallest significant quantity of vinylene carbonate, which may be 1 weight percent or less, and at the other extreme the use of polymers of vinylene carbonate containing the smallest significant quantity of ethylene which may be 1 weight percent or less, and all proportions between those extremes. However, of particular interest are ethylene/vinylene carbonate copolymers containing a major proportion by weight of ethylene and a minor proportion by weight of vinylene carbonate combined in the copolymeric material. Copolymer compositions within the range of ethylene:vinylene carbonate weight proportions of 99:1 to 70:30 are ordinarily most useful in the practice of the invention. It is often preferred to prepare copolymers by polymerization of monomeric material comprising ethylene and vinylene carbonate, containing a sufficiently high proportion of ethylene to produce a polyethylene-like material, i.e., a high molecular weight normally solid polymer having the general properties of polyethylene per se i.e., polyethylene prepared from monomeric material consisting of ethylene.

Any suitable combination of polymerization conditions resulting in the formation of a copolymer from a monomeric material comprising ethylene and vinylene carbonate can be employed. However, in preferred embodiments a monomeric material comprising ethylene and vinylene carbonate is subjected to copolymerization at high pressures, preferably at least 5000 pounds per square inch. Pressures of at least 15,000 pounds per square inch are more preferably employed, resulting in a product having high self-compatibility (homogeneity). Often optimum results are obtained at pressures within the range of 20,000 to 40,000 pounds per square inch. There is no particular upper pressure limit except that imposed by equipment limitations and pressures up to 200,000 pounds per square inch and even higher are suitable. It will be understood that suitable precautions should be observed in effecting this polymerization process, including the use of rupture discs, barriers, and other well-known means for carrying out high pressure reactions with safety. It is possible to have a combination of reaction conditions resulting in an explosive reaction, and this should be guarded against by known means. However, technical facilities for the commercial use of high pressures have been adequately developed, and therefore the high pressures employed are no barriers to commercial use of the high pressure copolymerization process. The copolymerization is preferably carried out at temperatures within a fairly broad range, which is preferably 35° C. to 125° C. The preferred range is 50° C. to 100° C.

The invention in its broadest aspects is not departed from by using ethylene-vinylene carbonate copolymers made by providing, in addition to ethylene and vinylene carbonate, other monomeric materials capable of entering into the polymerization reaction. Thus, vinyl chloride, vinyl acetate, vinyl fluoride, propylene, styrene, acrylonitrile, and other unsaturated organic compounds can be used as comonomers along with the ethylene and vinylene carbonate. This of course will affect the polymer properties but the amount can be chosen so as to retain the advantageous results of the copolymerization of vinylene carbonate with ethylene.

In copolymerizing ethylene with vinylene carbonate it is preferred to employ catalysts of the free-radical promoting type, principal among which are peroxide-type polymerization catalysts and azo-type polymerization catalysts, e.g., diacetyl peroxide, dimethylphenyl hydroperoxymethane, diazoaminobenzene, in small but catalytic amounts usually within the range of 0.001 to 0.5 percent by weight of the comonomers. The ethylene/vinylene carbonate copolymerization can be effected in the presence of catalytic amounts of oxygen, as within the range of 10 to 200 parts oxygen per million parts monomeric material on the weight basis. The copolymerization can also be effected under the influence of ionizing radiation of polymerizing intensity, such as gamma rays provided by cobalt-60 or other radioactive substances, using the general procedures described and claimed in the copending application of William H. Yanko and John D. Calfee, Serial No. 318,098, filed October 31, 1952. Copolymers of ethylene and vinylene carbonate employed in accordance with the present invention are inclusive of modified polymeric materials known as telomers, obtained by carrying out the copolymerization in the presence of materials which are non-polymerizable under the conditions employed but which combine with a plurality of units of the monomers, e.g., carbon tetrachloride, organic acids, esters, mercaptans, alcohols, etc. Additional details directed to the preparation of ethylene/vinylene carbonate copolymers, which can be used in the present invention, will be found in the above-mentioned copending application of Earl W. Gluesenkamp and John D. Calfee, Serial No. 355,859, filed May 18, 1953, now U.S. Patent No. 2,847,398.

Vinylene carbonate units in the ethylene/vinylene carbonate copolymers are subject to hydrolysis, whereby part or all of said units are converted to units of the following type in the polymer:

$$\begin{array}{c} \text{H} \ \text{H} \\ -\text{C}-\text{C}- \\ \text{O} \ \text{O} \\ \text{H} \ \text{H} \end{array}$$

The present invention includes the use of ethylene/vinylene carbonate copolymers that have undergone hydrolysis, and even that subsequent to hydrolysis have been subjected to further treatment to react other materials with part or all of the hydroxy groups, e.g., with aldehydes to produce acetals.

While this invention is directed particularly to homopolymers of styrene, it is permissible and not outside the broad scope of the invention to have other polymerizable unsaturated comonomers present during the polymerization, in amounts preferably not to exceed 15 weight percent and often less than 10 weight percent of total styrene plus comonomer, provided such comonomer, for example, α-methylstyrene, vinyltoluene, acrylonitrile, ethyl acrylate, butyl acrylate, methyl methacrylate, is not of such nature or of such quantity as to affect adversely the desired characteristics of the resulting polystyrene product.

Only small quantities of the ethylene/vinylene carbonate copolymer need be used. Ordinarily less than 5 weight percent of the copolymer, based upon the combined weight of styrene plus copolymer, is used. However, higher quantities, especially from 5 to 10 weight percent ethylene/vinylene carbonate copolymer, can be used to distinct advantage. The quantity of ethylene/vinylene carbonate copolymer to be used for optimum results will, of course, be dependent to a considerable extent on the general characteristics of the ethylene/vinylene carbonate copolymer as well as on the conditions employed in effecting the polymerization of styrene containing the copolymer. In any event, sufficient ethylene/vinylene carbonate copolymer is used to improve the impact strength of the resulting polystyrene-type resin. The ethylene/vinylene carbonate copolymer should be thoroughly and intimately dispersed in the monomeric styrene. The copolymer shows some solubility in styrene and by thorough agitation, aided if desired by warming, an intimate suspension and/or solution of ethylene/vinylene carbonate copolymer in styrene monomer is obtained. This intimate admixture is then subjected to polymerization. Such polymerization can be carried out without the use of any catalyst. However, it is much preferred in the practice of the invention to employ sufficient styrene polymerization catalyst to give a desired reaction rate. The polymerization can be effected at atmospheric or superatmospheric pressures. Suitable catalysts are of the free-radical promoting type, principal among which are peroxide type polymerization catalysts and azo type polymerization catalysts. Those skilled in the art are now fully familiar with a large number of peroxide type polymerization catalysts and a suitable one can readily be chosen by simple trial. Such catalysts can be inorganic or organic, the latter having the general formula: R'OOR", wherein R' is an organic radical and R" is an organic radical or hydrogen. These compounds are broadly termed peroxides, and in a more specific sense are hydroperoxides when R" is hydrogen. R' and R" can be hydrocarbon radicals or organic radicals substituted with a great variety of substituents. By way ow example suitable peroxide type catalysts include: benzoyl peroxide, tertiary butyl peroxide, tertiary butyl hydroperoxide, diacetyl peroxide, diethylperoxycarbonate, dimethylphenyl hydroperoxymethane (also known as cumene hydroperoxide), among the organic peroxides; hydrogen peroxide, potassium persulfate, perborates and other "per" compounds among the inorganic peroxides. The azo type polymerization catalysts are also well-known to those skilled in the art. These are characterized by the presence in the molecule of the group —N=N—; the dangling valences can be attached to a wide variety of organic radicals, at least one, however, preferably being attached to a tertiary carbon atom. By way of example of suitable azo type catalysts can be mentioned α,α'-azodiisobutyronitrile, p-bromobenzenediazonium fluoborate, N-nitroso-p-bromoacetanilide, azomethane, phenyldiazonium halides, diazoaminobenzene, p-bromobenzenediazonium hydroxide, p-tolyldiazoaminobenzene. The peroxy type or azo type or other free-radical promoting type of polymerization catalyst is used in small but catalytic amounts, which are generally not in excess of 1 percent by weight based upon the monomeric material. A suitable quantity is often in the range of 0.001 to 0.5 percent by weight.

For the most satisfactory results, the polymerization of styrene containing ethylene/vinylene carbonate copolymer should be effected under such conditions as will result in a final product having a molecular weight of at least 100,000 on the modified Staudinger scale.[1] Polymers having molecular weights appreciably above 500,000 tend to be difficult to process. Most satisfactory products have molecular weights within the range of 150,000 to 300,000. It is also important that the reaction conditions be such as will result in a high degree of conversion of the styrene to high molecular weight polymer, measured by an alcohol soluble content of less than 5 weight percent for the total product. Those skilled in the art, having had the benefit of the present disclosure, will be able to choose a combination of reactants and reaction conditions resulting in a product having the characteristics desired.

Polymerization of styrene, containing ethylene/vinylene carbonate copolymer dispersed therein, can be effected in accordance with the present invention by mass polymerization, i.e., the reaction mixture consists of the monomer (or monomers), ethylene/vinylene carbonate copolymer, and any catalyst, plus any mineral oil or other added material if same is to be incorporated during the polymerization and no added solvent or other reaction medium is present. Less preferably, polymerization can also be carried out by the suspension or emulsion tech-

---

[1] Molecular weight calculated by modified Studinger equation using the formula $[n]=KM^a$ wherein $K=7.54\times10^{-5}$, $a=0.783$ and M is the molecular weight.

niques. For suspension polymerization a reaction medium such as water is used together with a small amount of a suspending agent, for example tricalcium phosphate, a vinyl acetate-maleic anhydride copolymer product, etc., to give a suspension of particles of initial reaction mixture which are not of sufficiently small size as to result in a permanently stable latex as a final product. To effect emulsion polymerization, sufficient amount of emulsifying agent, for example a water soluble salt of a sulfonated long chain alkyl aromatic compound, is employed in suitable quantity along with vigorous agitation whereby an emulsion of the reactants in water is formed and the product is obtained in the form of a latex. The latex can then be coagulated if desired by known methods and the polymer separated from the water. The presence of dissolved or suspended ethylene/vinylene carbonate copolymer in the styrene monomer may tend to make it more difficult to form an emulsion than in the case of styrene monomer alone. However, the emulsion technique has certain advantages particularly in that a very high degree of conversion is attained. Conventional recipes and procedures for effecting mass, suspension and emulsion polymerization of styrene are so well-known to those skilled in the art that they need not be reiterated here. Polymerization can be effected by any of the conventional procedures with suitable modifications where necessary because of the presence of the ethylene/vinylene carbonate copolymer in the monomeric styrene. Use of an added organic solvent during the polymerization is apt to result in too low a molecular weight product, and therefore if such a solvent is desired other conditions should be such as to result in a high molecular weight product; for example, the use of a very high pressure tends to increase the molecular weight of the product under these circumstances.

If desired, a high molecular weight mineral oil can be employed in small quantities. Preferably such mineral oil is dissolved in the styrene monomer along with ethylene/vinylene carbonate copolymer prior to the polymerization. However, it is also permissible to incorporate mineral oil into the final polymerized product by milling or other suitable procedures. The mineral oil gives marked improvements in flexural deflection and tensile elongation, without adversely affecting the impact strength. The mineral oil should be of lubricating viscosity for best results, and should be principally aliphatic paraffinic hydrocarbon in character; preferably at least 80 percent should have an initial boiling point of at least 300° C. corrected to atmospheric pressure. Among high molecular weight mineral oils suitable for use are those which do not yield paraffin, i.e., normally solid paraffin wax, whether or not such paraffin is contained therein, essentially comprising refined substantially paraffin-free mineral or petroleum oils. An optimum embodiment of such oil is that referred to as "liquid petrolatum," e.g., those commercially available under the trade names "Nujol" and "Fractol." The quantity of mineral oil should not exceed 5 weight percent of the total material, and from 1 to 2 weight percent is often optimum. It is preferred to limit the quantity of mineral oil so as not to adversely affect to an important degree the heat distortion or softening temperature of the polystyrene-ethylene/vinylene carbonate product, e.g., not lower the ASTM heat distortion temperature by more than 10 to 15° C.

It is believed highly probable that in the practice of this invention a certain amount of interpolymerization occurs between styrene and ethylene/vinylene carbonate copolymer molecules with the resultant formation of what can be called a graft polymer, although it is by no means certain and is even doubtful that all molecules of ethylene/vinylene carbonate copolymer become united with one or more styrene monomer units. However, as indicated above, properties of products formed by polymerizing styrene containing preformed ethylene/vinylene carbonate copolymer are much superior to the same properties of blends formed by mere mechanical admixture of preformed polystyrene with preformed ethylene-vinylene carbonate copolymer. However, the invention is not to be limited by any theory of particular reaction mechanism.

The polystyrene type resin prepared as described herein can also have included therein additional materials such as plasticizers, stabilizers, fillers, dyes, pigments, other polymers and the like. Such materials can be added after preparation of the polymeric product, as by milling together or otherwise admixing the added materials with the polystyrene type product, or can be present during the polymerization provided such presence does not adversely affect the polymerization process or the product to an undesirable extent.

The products of the present invention can be subjected to injection or compression molding and other operations which are standard for polystyrene. Although it might be expected, because of the presence of vinylene carbonate units in the polymeric material, that the products would be somewhat more sensitive to heat than is polystyrene per se, no decomposition was noted at normal processing temperatures when using time-temperature cycles conventional for polystyrene molding. Ethylene/vinylene carbonate copolymers have only limited compatibility with polystyrene. Thus, the products of the invention are translucent at low concentrations of ethylene/vinylene carbonate copolymer, and become more opaque as the concentration of copolymer is increased. It is found that in addition of polymeric materials to styrene monomer which is then polymerized, best results are obtained in blends in which the added polymeric material is limitedly compatible. Completely compatible blends give improved properties only to a limited extent, and highly incompatible blends are weak, brittle, cheesy in nature, very opaque and for these reasons not useful.

The following examples provide details of certain preferred embodiments of the invention. The data are to be taken as exemplary, and the invention in its broadest aspects is not limited to the particular conditions, proportions and materials set forth therein.

*Example 1*

Ethylene/vinylene carbonate copolymer was prepared as follows:

A mixture of ethylene and vinylene carbonate monomers (5 to 1 weight ratio) was polymerized at 20,000 pounds per square inch with $\alpha,\alpha'$-azodiisobutyronitrile catalyst. The bomb was charged with the monomer mixture at $-78°$ C. and while the mixture was still cold, it was pressured to 6000 pounds per square inch with water. As the temperature rose to about 80° C., the pressure reached a maximum of 22,000 pounds per square inch. Under these conditions rapid polymerization occurred (1.75 hours) and the pressure dropped to 12,000 pounds per square inch. The copolymer was formed in 25 percent yield. It was found by direct oxygen analysis to contain 10.7 weight percent vinylene carbonate units in the copolymer.

The ethylene/vinylene carbonate copolymer had the following properties:

| | |
|---|---|
| Tensile strength at failure, p.s.i | 2229 |
| Tensile elongation at failure, percent | 470 |
| Clash-Berg data: | |
| $T_f$ (° C.) | $-24$ |
| $T_{2000}$ (° C.) | 82 |
| Stifflex range (° C.) | 106 |
| Approximate molecular weight (by melt viscosity) | 19,000 |
| Appearance | Almost clear (slightly hazy) |
| Density | 0.96 |

Example 2

The following mixture of materials was prepared:

| | |
|---|---|
| Styrene | parts by wt__ 93.5 |
| Ethylene/vinylene carbonate copolymer (Example 1 product) | parts by wt__ 5.0 |
| "NUJOL" mineral oil [1] | parts by wt__ 1.5 |
| Ditertiary butyl peroxide catalyst | wt. percent__ 0.01 |

[1] A highly purified mineral lubricating oil or liquid petrolatum meeting USP standards for internal use.

This initial reaction mixture was sealed in a glass tube under nitrogen (to exclude $O_2$), and polymerized for 24 hours at 90° C., followed by 24 hours at 120° C., and finally 4 hours at 180° C. The tube was thoroughly shaken every 20 minutess during the first 8 hours to insure intimate admixture of the contents. The polymerized product was removed from the tube, ground, and subjected to testing as described in Example 4 below.

Example 3

A commercial polystyrene (prepared by mass polymerization), in the amount of 97.5 parts by weight, was intimately mixed on hot mill rolls with 2.5 parts by weight of the ethylene/vinylene carbonate copolymer whose preparation is described in Example 1. Test data on this mechanical blend of polystyrene with ethylene/vinylene carbonate copolymer are described below in Example 4.

Example 4

The polymerization product of Example 2, and the mechanically blended product of Example 3 were subjected to standard plastics testing for various physical properties. Data obtained in the tests are given in the table below, together with comparative data on commercial polystyrene prepared by mass polymerization.

| Composition | Notched Impact Strength, ft./lbs. | Tensile Properties, Break | | Flexural Properties, Break | |
|---|---|---|---|---|---|
| | | p.s.i. | Percent Elong. | p.s.i. | Defl. (in.) |
| Example 2 product | 1.8 | 7,917 | 6.7 | 11,905 | 0.20 |
| Example 3 product | 0.70 | 7,300 | 4.3 | 15,149 | 0.27 |
| Commercial polystyrene | 0.67 | 7,812 | 2.9 | 16,454 | 0.23 |

Examination of the data in the above table shows several interesting facts. The product of Example 3, which is a mechanical admixture of polystyrene with ethylene/vinylene carbonate copolymer, does not show marked improvement in properties over the polystyrene itself, although the tensile elongation and flexural deflection have been slightly increased. On the other hand, the product of Example 2, which was made by polymerizing styrene monomer containing ethylene/vinylene carbonate copolymer, shows a very marked increase in notched impact strength. It has been established that this is due to the ethylene/vinylene carbonate copolymer and not to the mineral oil. The tensile properties are in the same range as the polystyrene except that the percentage elongation is considerably higher. This effect is caused by the presence of the mineral oil. The flexural properties are not as good as those of polystyrene, but are still satisfactory for practical commercial usage. The high impact strength makes this product outstanding for usages requiring particular toughness.

While the invention has been described with particular reference to various preferred embodiments thereof, it will be appreciated that variations from the details given herein can be effected without departing from the invention in its broadest aspects.

We claim:

1. A process which comprises intimately dispersing from 1 to 10 parts by weight of a solid ethylene/vinylene carbonate copolymer containing from 1 to 30 weight percent of combined vinylene carbonate in said copolymer, in from 99 to 90 parts by weight liquid monomeric styrene, and heating to polymerize the resulting material in the presence of an added free-radical polymerization catalyst to form a high impact strength composition having a molecular weight of at least 100,000 and an alcohol soluble content of less than 5 percent.

2. The composition obtained according to the process of claim 1.

References Cited in the file of this patent

UNITED STATES PATENTS

| 2,282,002 | Scott et al. | May 5, 1942 |
| 2,563,771 | Adelson | Aug. 7, 1951 |